(12) United States Patent
Robbins et al.

(10) Patent No.: US 7,410,122 B2
(45) Date of Patent: Aug. 12, 2008

(54) VTOL UAV WITH LIFT FANS IN JOINED WINGS

(75) Inventors: Brent A. Robbins, Saint Louis, MO (US); Patrick F. Cassidy, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/384,587

(22) Filed: Mar. 20, 2006

(65) Prior Publication Data

US 2007/0215748 A1 Sep. 20, 2007

(51) Int. Cl.
*B64C 15/02* (2006.01)
*B64C 29/00* (2006.01)

(52) U.S. Cl. .................... 244/12.3; 244/12.4; 244/23 B

(58) Field of Classification Search ............... 244/45 A, 244/45 R, 12.1, 12.3–12.5, 23 A, 23 B, 23 D, 244/52

See application file for complete search history.

(56) References Cited

U.S. PATENT DOCUMENTS

| | | | | |
|---|---|---|---|---|
| 1,879,857 A | * | 9/1932 | Schafran | 244/12.1 |
| 1,881,008 A | * | 10/1932 | Willoughby | 244/45 R |
| 2,939,649 A | * | 6/1960 | Shaw | 244/12.3 |
| 2,940,689 A | * | 6/1960 | Howell | 244/12.3 |
| 3,120,362 A | * | 2/1964 | Curtis et al. | 244/52 |
| 3,161,374 A | * | 12/1964 | Allred et al. | 244/12.3 |
| 3,286,470 A | * | 11/1966 | Gerlaugh | 60/229 |
| 3,972,490 A | * | 8/1976 | Zimmermann et al. | 244/12.3 |
| 4,336,913 A | * | 6/1982 | Hall | 244/45 R |
| D268,107 S | * | 3/1983 | Enav et al. | D12/331 |
| 4,767,083 A | * | 8/1988 | Koenig et al. | 244/12.3 |
| 4,828,203 A | * | 5/1989 | Clifton et al. | 244/12.3 |
| 4,856,736 A | * | 8/1989 | Adkins et al. | 244/45 R |
| 5,312,069 A | * | 5/1994 | Bollinger et al. | 244/12.3 |
| 5,454,531 A | * | 10/1995 | Melkuti | 244/12.6 |
| 5,899,410 A | * | 5/1999 | Garrett | 244/45 R |
| 5,984,229 A | * | 11/1999 | Hollowell et al. | 244/12.4 |
| 6,546,716 B2 | * | 4/2003 | Lair | 60/232 |
| 6,561,456 B1 | * | 5/2003 | Devine | 244/12.1 |

(Continued)

OTHER PUBLICATIONS

"Computer Program for Preliminary Design and Analysis of V/STOL Tip-Turbine Fans" Hilaer, Henry C., Seymour Lieblien and Bruce M. Auer, Feb. 1971, NASA TN D-6161 pp. 1-6.*

*Primary Examiner*—Michael R. Mansen
*Assistant Examiner*—Joseph W Sanderson
(74) *Attorney, Agent, or Firm*—MacPherson Kwok Chen & Heid LLP

(57) ABSTRACT

A vertical takeoff and landing ("VTOL") aircraft, e.g., an unmanned aerial vehicle ("UAV"), includes an elongated fuselage having a pair of forward swept wings and a pair of rearward swept canards, the outer tips of which are respectively joined with a respective tip end portion of one of the forward swept wings. The thrust outlet of a thrust-vectoring jet engine is disposed along the roll axis of the aircraft and aft of the pitch axis thereof, and a pair of downwardly exhausting ducted lift fans, e.g., tip turbine fans, are respectively disposed within a tip end portion of respective ones of the forward swept wings such that the fans are located symmetrically with respect to each other on opposite sides of the roll axis and forward of the pitch axis. The aircraft is capable of VTOL operations, including hovering, and is highly maneuverable at both very low and very high speeds.

13 Claims, 4 Drawing Sheets

U.S. PATENT DOCUMENTS

| | | | |
|---|---|---|---|
| 6,729,577 B2 * | 5/2004 | Morgenstern | 244/45 R |
| 6,840,478 B2 * | 1/2005 | Carr | 244/45 R |
| 6,848,649 B2 * | 2/2005 | Churchman | 244/12.6 |
| 6,938,408 B2 * | 9/2005 | Lair | 60/226.2 |
| 7,100,867 B2 * | 9/2006 | Houck, II | 244/34 A |
| 7,159,817 B2 * | 1/2007 | VanderMey et al. | 244/12.1 |
| 7,188,802 B2 * | 3/2007 | Magre | 244/7 R |
| 2006/0144991 A1 * | 7/2006 | Frediani | 244/45 R |
| 2006/0192046 A1 * | 8/2006 | Heath et al. | 244/12.3 |

* cited by examiner

VTOL UAV WITH LIFT FANS IN JOINED WINGS

TECHNICAL FIELD

This invention pertains to aircraft, in general, and in particular, to an unmanned aerial vehicle ("UAV") having lift fans in joined wings and a thrust-vectoring engine that provide it with vertical takeoff and landing ("VTOL") capabilities, including hovering, as well as both low- and high-speed maneuverability.

BACKGROUND

An unmanned aircraft ("UA"), or unmanned aerial vehicle ("UAV"), is a powered, heavier-than-air, aerial vehicle that does not carry a human operator, or pilot, and which uses aerodynamic forces to provide vehicle lift, can fly autonomously or be piloted remotely, can be expendable or reusable, and can carry a lethal or a non-lethal payload. Thus, ballistic or semi-ballistic vehicles, cruise missiles, and artillery projectiles are not considered UAVs.

In recent conflicts around the world, including the global war on terrorism, UAVs have proven to be very effective, both as a surveillance and intelligence-gathering tool, and as a weapons-delivery platform. Because UAVs are unmanned, and cost substantially less to produce and operate than conventional manned aircraft, they are capable of providing effective surveillance of an enemy, and/or of effecting a devastating attack upon him, while denying him either a high-value target or a potential captive in exchange.

One important task or mission for UAVs that has emerged recently is the laser illumination of a ground target by an aerial vehicle that is capable of entering a target area at a relatively high speed, hovering and/or maneuvering in that area at a relatively low speed while reflecting a laser beam from an allied ground or aerial vehicle onto a specific target, and then exiting the target area at a relatively high speed. This necessitates an aerial vehicle that has a wide sensor visibility, can carry a relatively heavy payload (e.g., ordinance, camera, laser reflector, and the like), is extremely maneuverable (i.e., can hover and effect quick changes in altitude and very small turn-radii) at slow speeds, and has a relatively high speed (i.e., high subsonic) flight capability.

BRIEF SUMMARY

In accordance with the exemplary embodiments thereof described herein, the present invention provides a VTOL aircraft, e.g., a UAV, that can carry a relatively heavy payload, including laser targeting reflectors, is extremely maneuverable (i.e., can effect quick changes in altitude and very small turn-radii) at slow speeds, and has a high speed (i.e., high subsonic) flight capability.

In one exemplary preferred embodiment, the aircraft comprises an airframe having an elongated fuselage and a joined wing, comprising a pair of forward swept main wings and a pair of rearward swept canards. Each of the forward swept wings has a root end attached at respective opposite sides of a rear portion of the fuselage and an opposite tip end, and each of the rearward swept canards has a root end respectively attached at an opposite side of a front portion of the fuselage, and an opposite tip end joined with a tip end portion of a corresponding one of the two forward swept wings. The aircraft conventionally includes three mutually orthogonal axes, viz., a longitudinal, or roll, axis, a transverse, or pitch, axis, and a vertical, or yaw axis, that extend through its center of gravity ("CG").

A jet engine capable of thrust-vectoring, e.g., a turbofan or a turbojet engine having movable vanes, nozzles, or a combination thereof disposed at its thrust outlet, is disposed within the fuselage along the roll axis of the aircraft with the thrust outlet located substantially rearward of the pitch axis of the aircraft. A pair of vertically directed ducted lift fans are respectively disposed within a tip end portion of a corresponding one of the forward swept main wings such that the fans are located symmetrically with respect to each other on opposite sides of the roll axis and substantially forward of the pitch axis.

The thrust vectoring of the engine can be either two-dimensional or three-dimensional thrust vectoring, and the ducted lift fans can comprise tip turbine fans driven by compressed gas bled off of the jet engine. The respective inlets and outlets of the lift fans are preferably openable and closable by means of movable louvers for streamlined high speed flight.

A vertical takeoff of the aircraft is effected by directing the thrust, or "thrust vector," of the engine substantially upward, increasing the respective thrusts of the engine and the ducted fans such that the sum of the moments of the respective thrusts about the CG of the aircraft is maintained at zero and the combined thrusts of fans and the engine exceeds the weight of the aircraft and causes the aircraft to rise vertically to a selected altitude. At the selected altitude, the direction of the thrust vector of the engine is rotated substantially forward, such that the aircraft accelerates to a forward speed at which the wings of the aircraft begin to produce lift. When the lift produced by the wings is equal to the weight of the aircraft, the respective upward thrusts of the lift fans are decreased until the weight of the aircraft is supported entirely by the lift of the wings, and the fans can then be shut down and the louvers on the fan inlets and outlets closed for streamlined high speed (e.g., 0.85 mach) flight.

During high speed flight, and in addition to the conventional mechanisms normally used to control the aircraft's lift and attitude relative to the conventional roll, pitch and yaw axes extending through its CG, i.e., its wings, ailerons, elevators, and rudders, the pitch of the aircraft can also be effectively controlled by rotating the direction of thrust of the engine upward or downward such that the aircraft pitches in a selected direction about the pitch axis of the aircraft. Alternatively or in addition to the foregoing, the aircraft can be yawed by rotating the direction of the thrust vector of the engine in a lateral direction such that the aircraft yaws in a selected direction about the yaw axis of the aircraft.

During low speed operation of the aircraft, in which the above conventional lift and attitude control mechanisms of the aircraft are substantially ineffective, hovering is achieved by directing the thrust of the engine substantially upward, increasing the respective thrusts of the engine and the lift fans such that the sum of the moments of the respective thrusts about the center of gravity of the aircraft is maintained at zero and the combined thrusts of the engine and the fans exceeds the weight of the aircraft and causes it to rise to a selected altitude, as in the above vertical takeoff scenario, and then decreasing the respective thrusts of the engine and the fans such that the sum of the moments of the respective thrusts about the center of gravity of the aircraft is maintained at zero, and the combined thrusts of the fans and the engine is equal to the weight of the aircraft, at which point the aircraft hovers at the selected altitude.

Low speed maneuvering of the aircraft is effected by increasing the thrust of the engine and rotating the direction of thrust of the engine forward until a vertical component of the engine thrust imparts a moment about the CG that is equal and opposite to the combined moments imparted about the CG by the thrust of the lift fans, the combined thrust of the engine and the lift fans is substantially equal to the weight of the aircraft, and the aircraft translates horizontally in a forward direction in response to the forward thrust component of the engine. Low speed yawing of the aircraft is effected in a similar manner, except that the direction of the engine thrust is directed laterally such that the aircraft yaws about the yaw axis in response to the lateral thrust component of the engine.

A better understanding of the above and many other features and advantages of the VTOL UAV of the present invention may be obtained from the detailed description of the exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
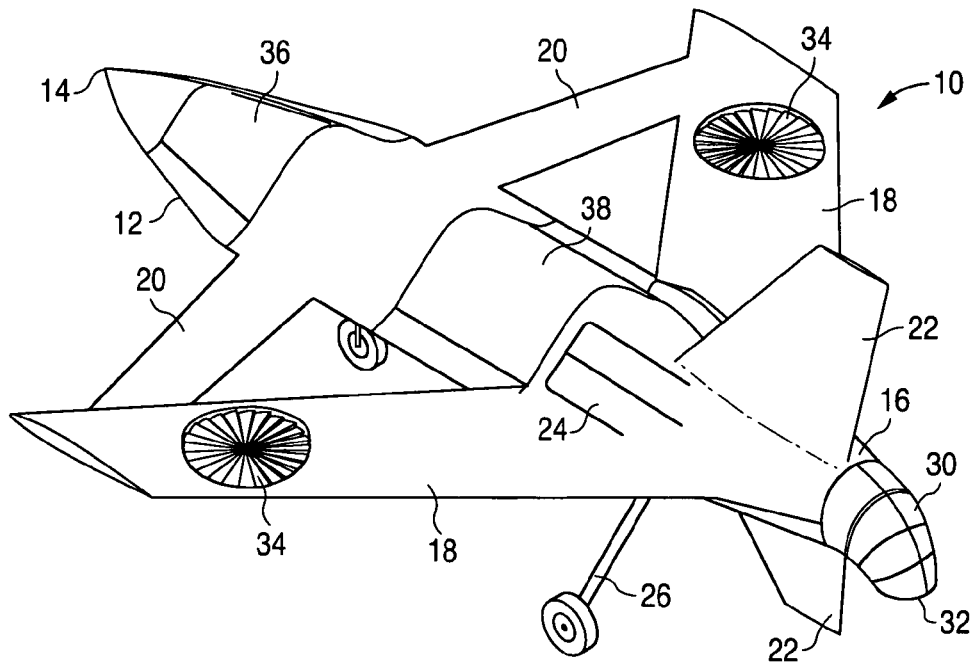
FIG. 1 is an upper left rear perspective view of an exemplary embodiment of a VTOL aircraft in accordance with the present invention.
Figure 2:
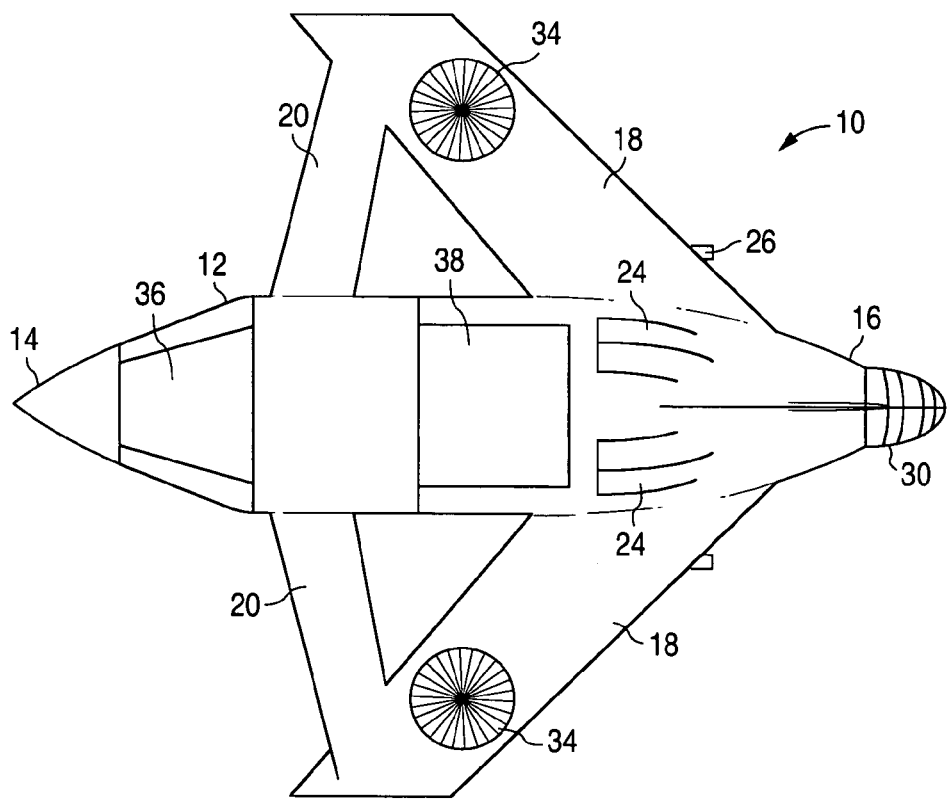
FIG. 2 is a top plan view of the exemplary aircraft.

FIGS. 1 and 2 are upper left rear perspective and top plan views, respectively, of an exemplary embodiment of a vertical takeoff and landing ("VTOL") aircraft 10, e.g., an unmanned aircraft ("UA") or unmanned aerial vehicle ("UAV"), in accordance with the present invention. As may be seen by reference to the figures, the aircraft comprises an airframe incorporating an elongated fuselage 12 having a nose end 14, a tail end 16, and a "joined" wing structure, which comprises a pair of forward swept main wings 18, each having a root end attached at a respective opposite side of a rear portion of the fuselage and an opposite tip end, and a pair of rearward swept canards 20, each having a root end respectively attached at an opposite side of a front portion of the fuselage, and an opposite tip end joined with a tip end portion of a corresponding one of the two forward swept wings. The airframe of the aircraft further includes vertical rudder structures 22, engine air intakes 24, and for takeoff and landing, a tricycle landing gear 26 that is retractable for streamlined high speed flight.

As those of skill in the art will appreciate, both the use of canards 20, i.e., horizontal control and stabilizing surfaces mounted forward of the main wing of an aircraft, and forward swept main wings 18, are known in the aviation field, and indeed, examples of their use in combination with each other, e.g., such as found in the Grumman X-29 and the Sukhoi S-37 "Berkut" experimental fighters, is also known. The use of forward swept wings and canards achieves a number of benefits, including that they enable the wings to be mounted farther back on the fuselage so that their connecting structure, e.g., spar connectors, does not interfere with things located inside the fuselage, such as payload. Additionally, air moving over forward-swept wings tends to flow inward toward the root of the wing instead of outward toward the wing tip, as with conventional swept back wings. This reverse flow of air prevents the wing tips and their ailerons from stalling at high angles of attack, and further, eliminates the formation of wing-tip vortices, thereby substantially decreasing aerodynamic drag on the vehicle. Although aircraft with forward swept wings are highly maneuverable, they are also typically aerodynamically unstable, and require the provision of an onboard computer control system, i.e., a so-called "fly-by-wire" control system, to be used practically. However, this is not seen as a major obstacle, particularly in the context of a UAV, in which many of the "autonomous" functions of the vehicle, e.g., hovering or straight-and-level high speed cruise, are already supported by such an onboard control system.

An additional advantage of the joined wing structure of the present invention may be seen by reference to the figures, wherein it will be noted that each of the two compound wing structures 18, 20, together with the portion of the fuselage 14 extending between their respective root ends, defines a rigid, open, triangular structure that, in addition to providing the vehicle 10 with the particular aerodynamic characteristics described above, also provide it with a bilateral pair of substantially rigid outboard mounting platforms for a corresponding pair of ducted lift fans 34, as described in more detail below.

Figure 3:
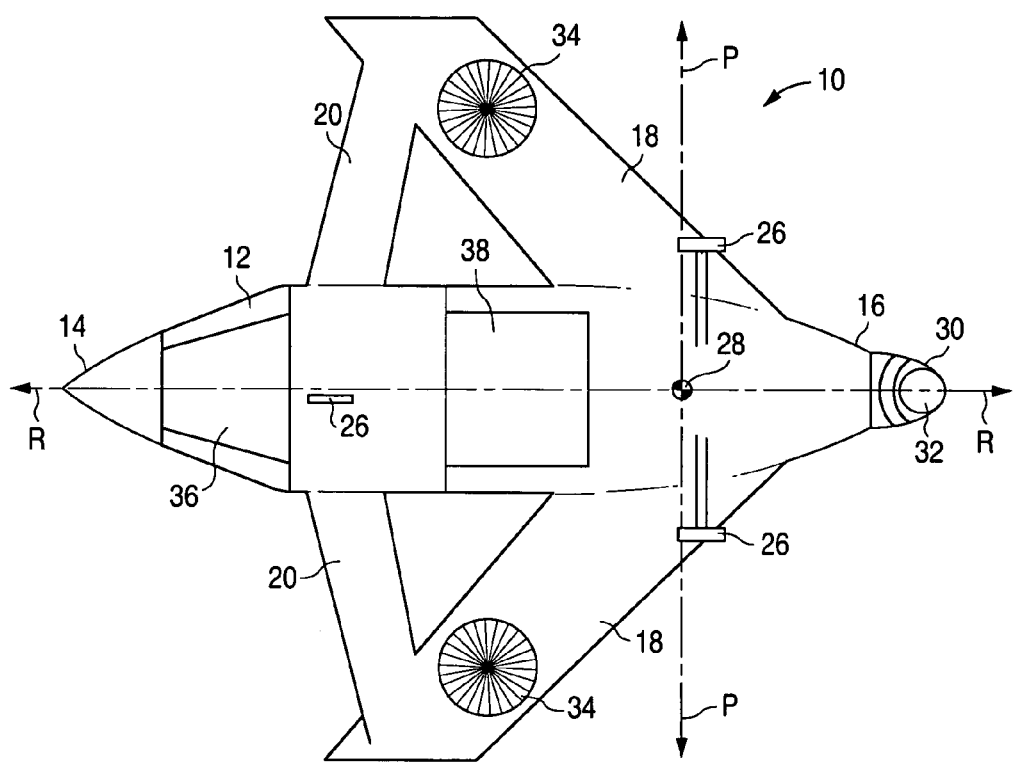
FIG. 3 is a bottom plan view thereof.
Figure 4:
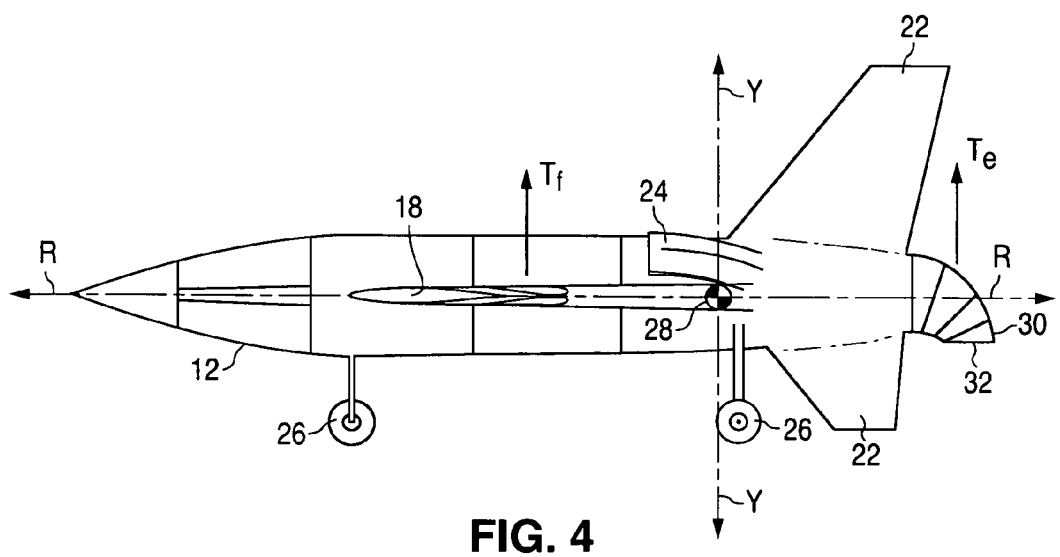
FIG. 4 is a left side elevation view thereof.
Figure 5:
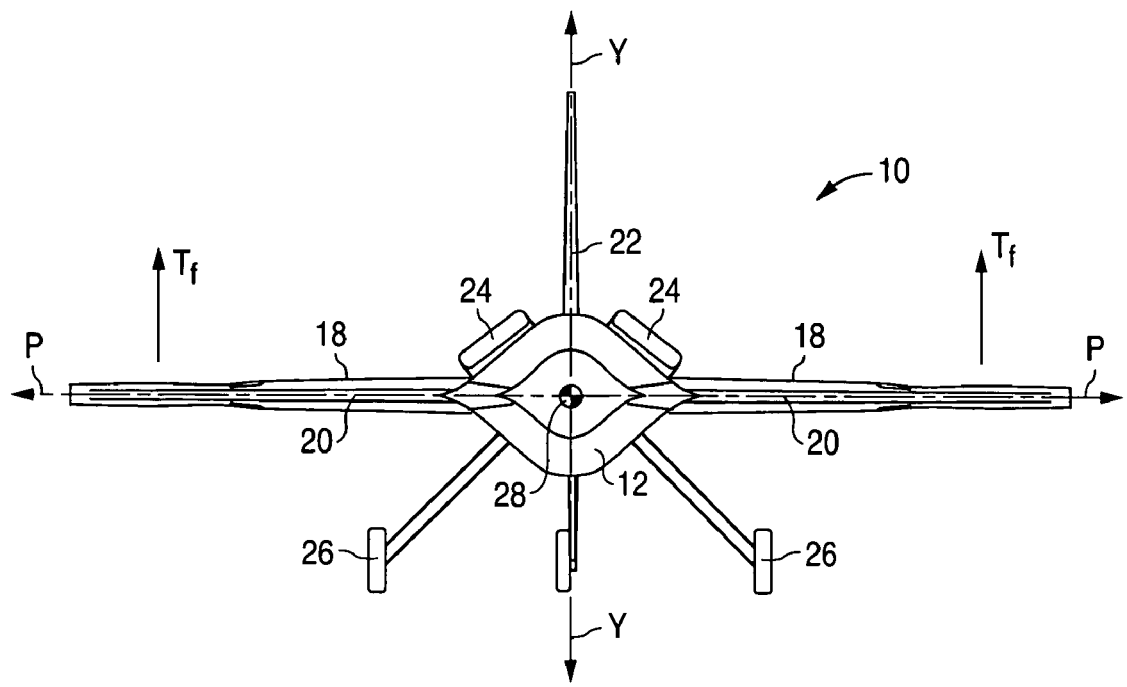
FIG. 5 is a front end elevation view thereof.

As may be seen with reference to FIGS. 3-5, the aircraft 10 conventionally includes three mutually orthogonal axes, viz., a longitudinal, or roll axis Y, a transverse, or pitch axis P, and a vertical, or yaw axis Y, that extend through its center of gravity ("CG") 28. A jet engine (not visible in the figures) having a thrust-vectoring capability, e.g., a turbofan or a turbojet engine which has movable vanes, flaps or a nozzle 30 disposed at its thrust outlet 32, is disposed within the fuselage 12 along the roll axis R of the aircraft, with the thrust outlet 32 located substantially rearward of the pitch axis P of the aircraft. Additionally, a pair of downwardly exhausting ducted lift fans 34 are respectively disposed within a tip end portion of a corresponding one of the forward swept wings 18, such that the lift fans are located symmetrically with respect to each other on opposite sides of the roll axis, and substantially forward of the pitch axis.

Although the engine of the aircraft 10 can comprise either a turbojet or a turbofan engine, a turbojet is somewhat contraindicated in a subsonic VTOL embodiment because the engine must be sized to achieve vertical lift, rather than only conventional flight, resulting in a weight penalty, and because afterburning, necessary for supersonic flight, is difficult and expensive to implement in a three-dimensional thrust-vectoring nozzle or vane arrangement 30. Similarly, while other types of thrust-vectoring mechanisms, e.g., so-called "fluidic vectoring" techniques, can be utilized in the aircraft in place of the thrust-vectoring nozzle and/or vane arrangement, these are currently not capable of achieving the same range of thrust deflection as the former.

The thrust-vectoring mechanism 30 of the engine can effectively deflect, i.e., direct, the thrust of the engines as much as 90 degrees relative to the thrust vector of a conventional "axisymmetric" engine nozzle. In a conventional "two-dimensional" thrust-vectoring arrangement, this deflection is limited to ±90 degrees up-and-down deflections, whereas, in a "three-dimensional" arrangement, the deflection includes both ±90 degrees up-and-down, and left-and-right lateral deflections, such that the thrust vector of the engine can be directed along an axis located virtually anywhere within a substantially hemispherical region behind the respective engines. The thrust vectoring of the engine of the exemplary embodiment described herein can be either two-dimensional or three-dimensional thrust vectoring, but the latter provides a greater range of maneuverability of the aircraft, particularly at low speeds.

The ducted lift fans 34 are respectively disposed within the tip portions of the main wings 18 to exhaust, or direct, the flow of air downward, and thereby produce an upward thrust, or lift, and can be implemented in a number of possible configurations, including fans driven by electric motors, but in a preferred embodiment, the fans comprise "tip turbine fans," i.e., fans having variable pitch blades which are driven by compressed gas bled off of a compressor stage of the jet engine and expelled through nozzles at the tips of the blades, such as were used in the GERyan XV-5A experimental aircraft. Thus, the respective thrusts provided by the fans are independently and finely adjustable by controlling the pitch of the respective blades of the fans, as well as by control of their respective speeds of rotation, i.e., their respective RPMs. The respective inlets and outlets of the ducted fans are preferably openable and closable by means of movable louvers, which function to close off the fan inlets and outlets in high speed flight, during which operation of the fans is not required, thereby streamlining the upper and lower surfaces of the wings at the fan locations to minimize parasitic drag generated by the openings.

Figure 6:
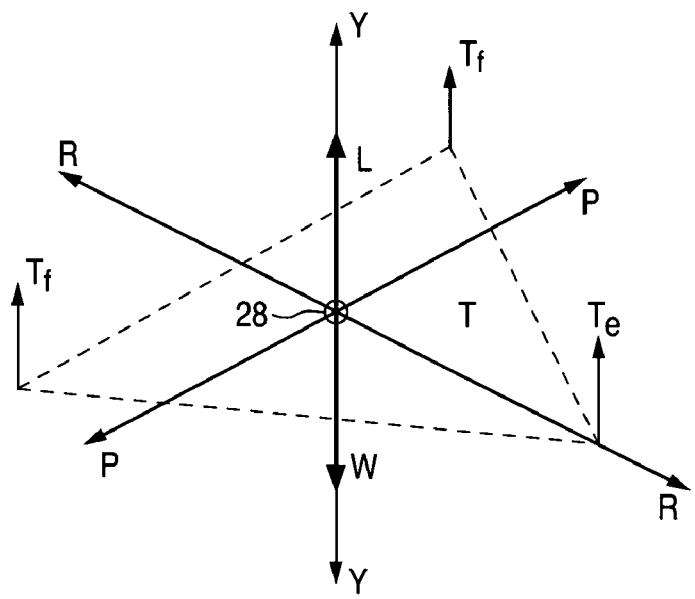
FIG. 6 is a thrust, weight and lift vector diagram applicable to the exemplary aircraft.

FIG. 6 is a perspective view of a thrust and weight vector diagram of the exemplary VTOL aircraft 10, as seen looking into the upper rear left side thereof, which illustrates how the disposition of the respective thrust outlets of the engine and the lift fans 34 forward and aft of the CG 28 of the aircraft, as described above, provide it with both VTOL capability and high maneuverability at both very low and very high speeds. As may be noted from the figure, when the lift fans are each producing an upwardly directed thrust vector $T_f$, and the thrust vector of the engine $T_e$ is also directed upward, the thrust system defines a so-called "three-post" lift system, which can be used to cause the aircraft to levitate, i.e., takeoff vertically without yawing or pitching, to a selected altitude, and to hover, i.e., remain stationary, at that altitude. Thus, it will be seen that, by placing the thrust outlet 32 of the jet engine substantially rearward of the CG, and by placing the lift fans within a tip end portion of a corresponding one of the forward swept main wings 18, such that the fans are located symmetrically with respect to each other, i.e., equidistantly, on opposite sides of the roll axis R, and substantially forward of the pitch axis P (and hence, the CG), a bilaterally symmetrical, triangular-shaped lift pattern, or "platform," is established relative to the longitudinal, or roll axis R, upon which the weight W of the aircraft, acting through its CG, is stably supported. Unstable pitching, rolling and yawing of the aircraft is thus prevented simply by maintaining the sum of the moments of the respective thrusts of the engines and lift fans about the CG of the aircraft at zero.

Thus, a vertical takeoff of the aircraft 10 is effected by directing the exhaust of the engine substantially downward, and hence, its thrust vector $T_e$ substantially upward, increasing the respective thrusts of the engine and the lift fans 34 $T_e$ and $T_f$ such that the sum of the moments of the respective thrusts about the center of gravity 28 of the aircraft is maintained at zero, the combined thrusts of lift fans and the engine exceed the weight W of the aircraft, and the aircraft rises to a selected altitude. The direction of engine thrust $T_e$ of the engine is then directed forward, such that the aircraft accelerates to a forward speed at which the wings 18, 20 of the aircraft begin to produce lift. When the lift L produced by the wings is equal to the weight W of the aircraft, the respective upward thrusts of the lift fans $T_f$ is decreased until the weight of the aircraft is supported entirely by the lift developed by the wings, whereupon the fans are stopped and the louvers on the fan inlets and outlets are then closed for streamlined high speed flight.

During high speed flight of the aircraft 10, and in addition to the conventional mechanisms normally used to control the aircraft's lift and attitude relative to its roll, pitch and yaw axes R, P and Y, i.e., its wings, ailerons, elevators and rudders, the pitch of the aircraft 10 can also be effectively controlled by rotating the direction of thrust $T_e$ of the engine in a vertical direction, i.e., upward or downward, such that the aircraft pitches in a selected direction about the pitch axis of the aircraft. Alternatively, or in addition to the foregoing, the aircraft can be yawed by rotating the direction of the thrust vector of the engine in a lateral direction such that the aircraft yaws in a selected direction about the yaw axis of the aircraft.

During low speed operation of the aircraft 10, in which the above conventional lift and attitude control mechanisms of the aircraft are substantially ineffective, hovering is achieved, as above, by directing the thrust of the engine $T_e$ upward, increasing the respective thrusts of the engine and the lift fans 34 $T_e$ and $T_f$ such that the sum of the moments of the respective thrusts about the center of gravity 28 of the aircraft is maintained at zero, the combined thrusts of the engine and the fans exceed the weight W of the aircraft, and the aircraft rises to a selected altitude, and then decreasing the respective thrusts of the engine and the fans such that the sum of the moments of the respective thrusts about the center of gravity of the aircraft is maintained at zero, the combined thrusts of the fans and the engine is equal to the weight of the aircraft, and the aircraft hovers at the selected altitude without any pitching, rolling or yawing thereof.

Low speed maneuvering of the aircraft 10 is then effected by rotating the direction of thrust of the engine forward until the sum of the moments of the respective thrusts of the engine and the lift fans 34 $T_e$ and $T_f$ about the center of gravity 28 of the aircraft is maintained at zero, the combined thrust of the engine and the fans is substantially equal to the weight W of the aircraft, and the aircraft translates horizontally in a forward direction. Low speed yawing of the aircraft is effected in a similar manner, except that the direction of thrust of the engine is directed laterally such that the aircraft yaws about the yaw axis in response to the moment about the CG of the lateral thrust component of the engine.

Figure 7:
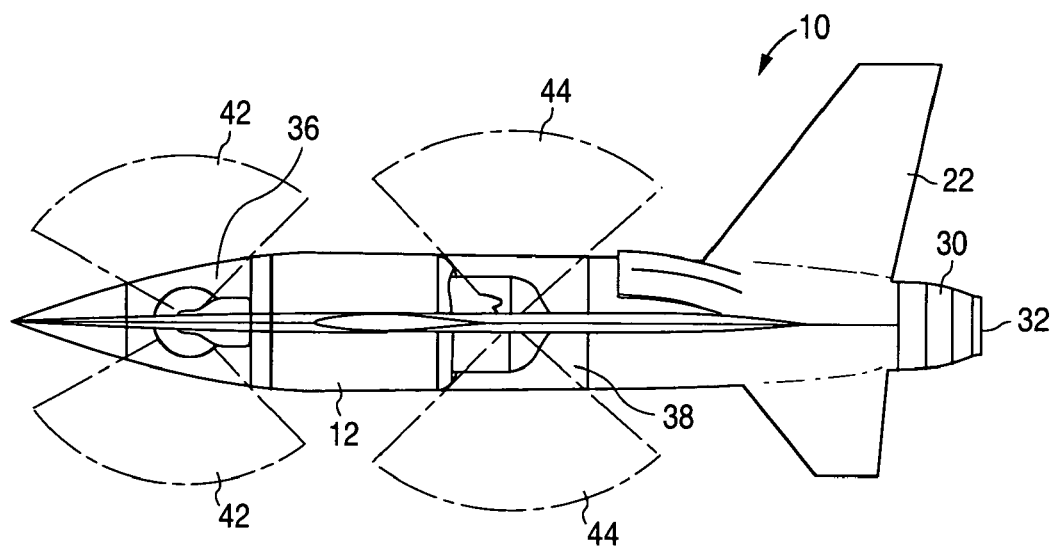
FIG. 7 is a left side elevation view of the exemplary aircraft, showing upper and lower arcs of longitudinal visibility from two equipment bays of the aircraft; and, FIG. 8 is a front end elevation view of the exemplary aircraft, showing upper and lower arcs of lateral visibility from the two equipment bays of the aircraft.
Figure 8:
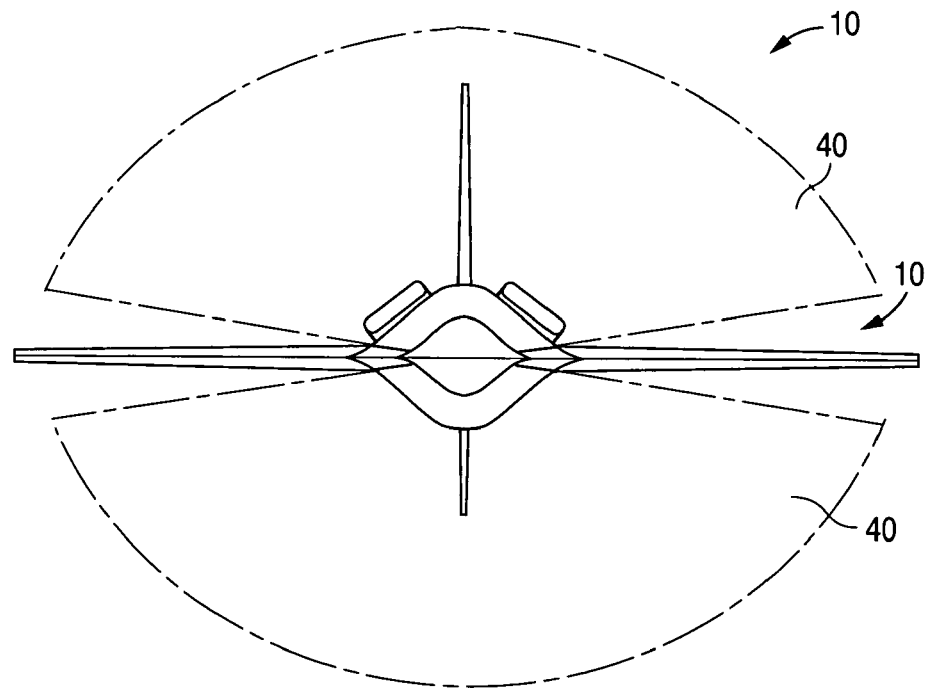

Another advantage of the compound wing and engine arrangement is illustrated in the respective left side and front end elevation views of FIGS. 7 and 8, namely, the enhanced visibility afforded to optical components (not illustrated) located within the fuselage 12 of the aircraft. In particular, if forward and aft equipment bays 36 and 38 of the fuselage 12 are provide with upper and lower "windows," or transparent skins, then equipment located in the forward bay will have a >300 degree lateral arc of view 40 and a >200 degree longitudinal arc of view 42 from the interior of the aircraft, whereas, the equipment located in the aft bay will have a similar lateral arc of view and a >180 longitudinal arc of view 44, as illustrated in the figures.

By now, those of skill in this art will appreciate that many modifications, substitutions and variations can be made in and to the materials, apparatus, configurations and methods of the VTOL aircraft of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A VTOL aircraft, comprising:
an elongated fuselage;
a pair of forward swept main wings, each having a root end respectively attached at an opposite side of a rear portion of the fuselage and an opposite tip end;
a pair of rearward swept canards, each having a root end respectively attached at an opposite side of a front portion of the fuselage and an opposite tip end conjoined with a tip end portion of a corresponding one of the forward swept main wings at position disposed substantially forward of a pitch axis of the aircraft;
a thrust-vectoring jet engine disposed along a roll axis of the aircraft and having a thrust outlet disposed substantially aft of the pitch axis thereof; and,
a pair of downwardly exhausting ducted lift fans respectively disposed within a tip end portion of a corresponding one of the forward swept main wings such that the fans are located symmetrically with respect to each other on opposite sides of the roll axis and substantially forward of the pitch axis, wherein
the thrust-vectoring engine and the ducted lift fans operate in cooperation with each other to define a bilaterally symmetrical, triangular-shaped lift platform having a base extending between the ducted lift fans, an apex coincident with the thrust outlet of the thrust-vectoring jet engine and a centroid coincident with the center of gravity (CG) of the aircraft and upon which the weight of the aircraft is stably supported so as to prevent unstable pitching, rolling and yawing of the aircraft during hovering and low speed operations.

2. The VTOL aircraft of claim 1, wherein the thrust-vectoring engine comprises a turbofan engine or a turbojet engine.

3. The VTOL aircraft of claim 1, wherein the thrust vectoring comprises two-dimensional or three-dimensional thrust vectoring.

4. The VTOL aircraft of claim 1, wherein the thrust vectoring is effected by means of movable vanes, flaps, nozzles or a combination thereof, disposed at a thrust outlet of the engine.

5. The VTOL aircraft of claim 1, wherein the lift fans comprise tip turbine fans driven by compressed gas bled off of the jet engine.

6. The VTOL aircraft of claim 1, wherein inlets and outlets of the lift fans are respectively openable and closable by movable louvers.

7. The VTOL aircraft of claim 1, wherein the aircraft comprises a UAV.

8. A method of operating a VTOL aircraft, the method comprising:
providing the aircraft of claim 1;
directing the thrust of the engine substantially upward;
increasing the respective thrusts of the engine and the lift fans such that the sum of the moments of the respective thrusts about the center of gravity of the aircraft is maintained at zero, the combined thrusts of the fans and the engine exceeds the weight of the aircraft, and the aircraft rises to a selected altitude;
rotating the direction of thrust of the engine forward such that the aircraft accelerates to a forward speed at which the wings of the aircraft produce lift; and,
decreasing the respective thrusts of the lift fans when the lift produced by the wings is equal to the weight of the aircraft.

9. The method of claim 8, further comprising rotating the direction of thrust of the engine in a vertical direction such that the aircraft pitches in a selected direction about the pitch axis of the aircraft.

10. The method of claim 8, further comprising rotating the direction of thrust of the engine in a lateral direction such that the aircraft yaws in a selected direction about a yaw axis of the aircraft.

11. A method of operating a VTOL aircraft, the method comprising:
providing the aircraft of claim 1;
directing the thrust of the engine substantially upward;
increasing the respective thrusts of the engine and the lift fans such that the sum of the moments of the respective thrusts about the center of gravity of the aircraft is maintained at zero, the combined thrusts of the fans and the engine exceed the weight of the aircraft, and the aircraft rises to a selected altitude; and,
decreasing the respective thrusts of the engine and the lift fans such that the sum of the moments of the respective thrusts about the center of gravity of the aircraft is maintained at zero, the combined thrusts of the fans and the engine is equal to the weight of the aircraft, and the aircraft hovers at the selected altitude.

12. The method of claim 11, further comprising:
increasing the thrust of the engine; and,
rotating the direction of thrust of the engine rearward until an upward component of the engine thrust is substantially equal to the combined thrust of the lift fans, the sum of the moments of the respective thrusts about the center of gravity of the aircraft is maintained at zero, the combined thrust of the engine and the lift fans is substantially equal to the weight of the aircraft, and the aircraft translates horizontally in a forward direction.

13. The method of claim 11, further comprising:
increasing the thrust of the engine; and,
rotating the direction of thrust of the engine in a lateral direction until the sum of the moments of the respective thrusts of the engine and the lift fans about the center of gravity of the aircraft is maintained at zero, the combined thrust of the engine and the lift fans is substantially equal to the weight of the aircraft, and the aircraft yaws about a yaw axis of the aircraft.

* * * * *